(12) United States Patent
Corn

(10) Patent No.: US 8,636,553 B1
(45) Date of Patent: *Jan. 28, 2014

(54) ASSEMBLY AND METHOD TO ATTACH A DEVICE SUCH AS A HYDROFOIL TO AN ANTI-VENTILATION PLATE

(75) Inventor: James F. Corn, Kearney, MO (US)

(73) Assignee: Sport Marine Technologies, Inc., Pilot Point, TX (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/066,288

(22) Filed: Apr. 11, 2011

Related U.S. Application Data

(63) Continuation-in-part of application No. 12/150,598, filed on Apr. 29, 2008, now Pat. No. 8,043,135.

(51) Int. Cl.
*B63H 5/16* (2006.01)

(52) U.S. Cl.
USPC .......................................................... 440/66

(58) Field of Classification Search
USPC .................... 440/53, 66, 71, 72, 76; 114/274
See application file for complete search history.

(56) References Cited

U.S. PATENT DOCUMENTS

| | | | |
|---|---|---|---|
| 2,319,640 A | 5/1943 | Sink | |
| 2,963,000 A * | 12/1960 | Fester | 440/71 |
| 2,998,795 A | 9/1961 | Downie et al. | |
| 3,099,240 A | 7/1963 | Montague, Jr. | |
| 3,114,343 A | 12/1963 | Headrick et al. | |
| 3,139,853 A | 7/1964 | McCarthy et al. | |
| 3,211,119 A | 10/1965 | Kiekhaefer | |
| 3,343,512 A | 9/1967 | Ramussen | |
| 3,433,195 A | 3/1969 | Poole | |
| 3,765,356 A | 10/1973 | Cook | |
| 3,964,417 A | 6/1976 | Williams et al. | |
| 4,040,373 A | 8/1977 | Jones, Jr. | |
| 4,100,876 A | 7/1978 | Feleus | |
| 4,205,618 A | 6/1980 | Olsson | |
| 4,304,557 A | 12/1981 | Henrich | |
| 4,323,355 A | 4/1982 | Kondo | |
| D271,582 S | 11/1983 | Knowles | |

(Continued)

FOREIGN PATENT DOCUMENTS

| | | |
|---|---|---|
| GB | 716879 | 10/1954 |
| SE | 226596 | 5/1969 |

OTHER PUBLICATIONS

Portion of front of package insert, XRIII hydrofoil, dated 2007 from Marine Dynamics, Inc.

(Continued)

*Primary Examiner* — Daniel Venne
(74) *Attorney, Agent, or Firm* — Law Office of William Gustavson, PC

(57) ABSTRACT

An assembly (10) is provided for mounting a hydrofoil, trolling plate or trolling motor (or other accessory) on the anti-ventilation plate (14) of a sterndrive or outboard motor (16) without the need to modify the plate or motor. The assembly (10) has lower and upper elements (20, 22) which are secured about the plate (14) by bolts (34). The upper element (22) has a bolt pattern (40) to mount the hydrofoil or other device. A catch (60, 88, 88*a*, 88*b*, 88*c*, 88*d*) mounted on the lower element (20) can be engaged in the trim tab or anode recess. Grip devices (50) can be mounted on the lower element (20) that are adjusted to grip the edges of the plate (14).

18 Claims, 20 Drawing Sheets

(56) References Cited

U.S. PATENT DOCUMENTS

| | | | |
|---|---|---|---|
| 4,487,152 A | 12/1984 | Larson | |
| 4,597,742 A | 7/1986 | Finkl | |
| 4,708,672 A | 11/1987 | Bentz et al. | |
| 4,738,644 A | 4/1988 | Happel | |
| 4,744,779 A | 5/1988 | Koehler | |
| 4,756,265 A | 7/1988 | Lane | |
| D307,130 S | 4/1990 | Ellis | |
| D308,851 S | 6/1990 | Templeman | |
| D311,513 S | 10/1990 | Templeman | |
| 5,048,449 A | 9/1991 | Templeman | |
| 5,107,786 A | 4/1992 | Templeman | |
| D328,732 S | 8/1992 | Whitley et al. | |
| 5,138,966 A | 8/1992 | Whitley et al. | |
| D331,738 S | 12/1992 | Simpson | |
| 5,178,089 A | 1/1993 | Hodel | |
| 5,203,275 A | 4/1993 | Brauner et al. | |
| 5,231,950 A | 8/1993 | Poulos | |
| 5,307,754 A | 5/1994 | Leonardis | |
| D351,129 S | 10/1994 | Templeman | |
| D352,023 S | 11/1994 | Corn | |
| 5,396,860 A | 3/1995 | Cheng | |
| 5,425,663 A | 6/1995 | Meisenburg et al. | |
| D363,914 S | 11/1995 | Corn | |
| 5,493,990 A | 2/1996 | Dyer | |
| 5,588,390 A | 12/1996 | French | |
| 5,638,765 A * | 6/1997 | Poulos | 114/274 |
| 5,848,922 A | 12/1998 | Itima et al. | |
| 6,503,110 B2 | 1/2003 | Lammli | |
| D487,245 S | 3/2004 | Geriene et al. | |
| D492,242 S | 6/2004 | Geriene et al. | |
| 6,948,441 B2 | 9/2005 | Levine | |
| 7,011,559 B1 | 3/2006 | Moldenhauer | |
| D533,497 S | 12/2006 | Templeman | |
| 7,232,355 B2 | 6/2007 | Woolley | |
| 7,270,584 B1 | 9/2007 | Mitchell | |
| D589,866 S | 4/2009 | Templeman et al. | |
| D590,760 S | 4/2009 | Templeman et al. | |
| 7,520,238 B2 | 4/2009 | Patterson | |
| D591,664 S | 5/2009 | Corn | |
| 7,568,443 B2 | 8/2009 | Walker | |
| D615,475 S | 5/2010 | Corn | |
| D640,179 S | 6/2011 | Corn | |
| 8,043,135 B1 * | 10/2011 | Corn | 440/66 |
| 8,302,549 B2 * | 11/2012 | Templeman et al. | 114/274 |

OTHER PUBLICATIONS

Portion of back of package insert, XRIII hydrofoil, dated 2007 from Marine Dynamics, Inc.
Internet catalog of Marine Dynamics, Inc. downloaded 2008.
Ad from Marine Dynamics, Inc. date unknown.
Advertisement, Sting Ray Hydrofoil Stabilizer, IMTEC 1994.
Article, Build Your Own Ski Boat, Waterski, Nov./Dec. 1994, Author Pierce Hoover.
Advertisement, Doel-fin Boat Stabilizer, Doelcher Products, Inc., 1979.
Article, Doel fin Not Just Another Gadget, Jul. 1979.
Advertisement, Break Through of Doel fin Stabilizer, 1979.
Article, Hydrofoils: How Good Are They? Tailer Boats, Apr. 1994; pp. cover, 64-69.
Article, Hydrofoils: How Good Are They? by Jim Barron, 1994.
Advertisement, Hydrofoil G.T., Hydrofoil International Corp., 1994.
Advertisement, Sting Ray Hydrofoil Stabilizer, 1988, Marine Dynamics, Inc.
Advertisement, Trailer Boats, p. 130 Sting Ray Hydrofoil Stabilizer, 1988.
Advertisement, Bass Pro, p. 100, 1988.
Advertisement, p. 36, 1991.
Article, Rig for Range by John L. Beath, Trailer Boats, May 31, 2005.
Article, Fin Fight by Jim Barron, Bass & Walleye Boats, Winter 1994 pp. 40-43.
Article, 10 Cures for Poor Holeshot by John Tiger, Jr., Bass & Walleye Boats, Feb. 2000, pp. 54-56.
Ad from Cabella's website for XR High Performance Hydrofoil Stabilizer, downloaded from Internet early 2006.
Tech Letter re SE Sport hydrofoil, Trailer Boats, Aug. 2005, p. 76.
Ad, SE Sport hydrofoil, Go Boating, Apr. 2005, p. 36.
Ad, XR hydrofoil, Boating Life, Feb. 2006, p. 94.

* cited by examiner

ASSEMBLY AND METHOD TO ATTACH A DEVICE SUCH AS A HYDROFOIL TO AN ANTI-VENTILATION PLATE

CROSS REFERENCE TO RELATED APPLICATION

This application is a continuation in part of U.S. patent application Ser. No. 12/150,598 filed Apr. 29, 2008

TECHNICAL FIELD

This invention relates to marine operations, and in particular to a boating accessory.

BACKGROUND OF THE INVENTION

Many boaters find it desirable to mount a hydrofoil on the outboard motor or sterndrive of a pleasure boat. The hydrofoil is believed to provide enhanced efficiency and speed in boat operation. Examples of such hydrofoils are illustrated in U.S. Design Pat. D352,023 issued Nov. 1, 1994 and D363,914 issued Nov. 7, 1995, the disclosures of which is hereby incorporated by reference.

Unfortunately, the mounting of such a hydrofoil often requires a permanent modification of the outboard motor or sterndrive, such as drilling holes to receive bolts, for example. Boat owners are often reluctant to make such permanent modifications or to expend the time and effort necessary to make the modifications. A need exists to provide a more simple and effective mounting of a hydrofoil without permanent modification of the outboard motor or sterndrive.

SUMMARY OF THE INVENTION

In accordance with one aspect of the present invention, an assembly is provided for mounting to a plate on a marine component. The assembly includes a first element. The plate has a trim tab recess and the first element has a catch. The assembly is secured to the plate by the catch engaging the trim tab recess. In accordance with another aspect of the present invention, the catch can be adjustably mounted on the first element for movement toward and away from the trim tab recess. In accordance with another aspect of the present invention, the marine component has a bolt to secure a trim tab in the trim tab recess, the catch having a hole to receive the bolt. In accordance with another aspect of the present invention, the catch has a plurality of holes to permit the catch to be used with marine components of different configurations. The holes can be of different diameter.

In accordance with another aspect of the present invention, the plate is an anti-ventilation plate on a sterndrive (inboard/outboard) or outboard motor. In accordance with another aspect of the present invention, the first element is a lower element having first and second sides. The assembly further has an upper element with first and second sides. At least one fastener is used on a first side of the upper and lower elements and at least one fastener is used on a second side of the upper and lower elements, the first and second sides being on opposite sides of the plate. In accordance with another aspect of the present invention, the upper and lower elements have apertures for receiving the fasteners. The upper and lower elements can have multiple apertures to adapt the assembly to plates of different widths. The upper element has at least one pattern of holes to which can be mounted a hydrofoil, trolling motor, trolling plate or other accessory.

In accordance with another aspect of the present invention, the assembly is also secured to the plate by frictional engagement between the elements and plate. In accordance with another aspect of the present invention, the assembly is secured to the plate by adhesive. In accordance with yet another aspect of the present invention, the assembly is secured to the plate by opposed grips mounted in the lower element tightened against the edges of the plate.

In accordance with another aspect of the present invention, the upper element is a hydrofoil.

BRIEF DESCRIPTION OF THE DRAWINGS

A more complete understanding of the invention and its advantages will be apparent from the following Detailed Description, taken in conjunction with the accompanying Drawings, in which:

FIGS. 11a-d illustrate variations of the tab catch;

DETAILED DESCRIPTION

With reference now to the figures, FIGS. 1-13 and 16-18 illustrate an assembly 10 forming a first embodiment of the present invention. The assembly 10 is shown to mount a hydrofoil 12 on the anti-ventilation plate 14 (also commonly called a cavitation plate) of an outboard motor 16 without any need to modify, drill or otherwise permanently change the plate 14 or outboard motor 16. While an outboard motor 16 is shown, the assembly 10 could be used with a sterndrive (inboard/outboard). Further, while assembly 10 is shown to mount a hydrofoil, it could also mount a trolling motor or a trolling plate extending behind the propeller used to reduce thrust, or other accessory.

Figure 1:
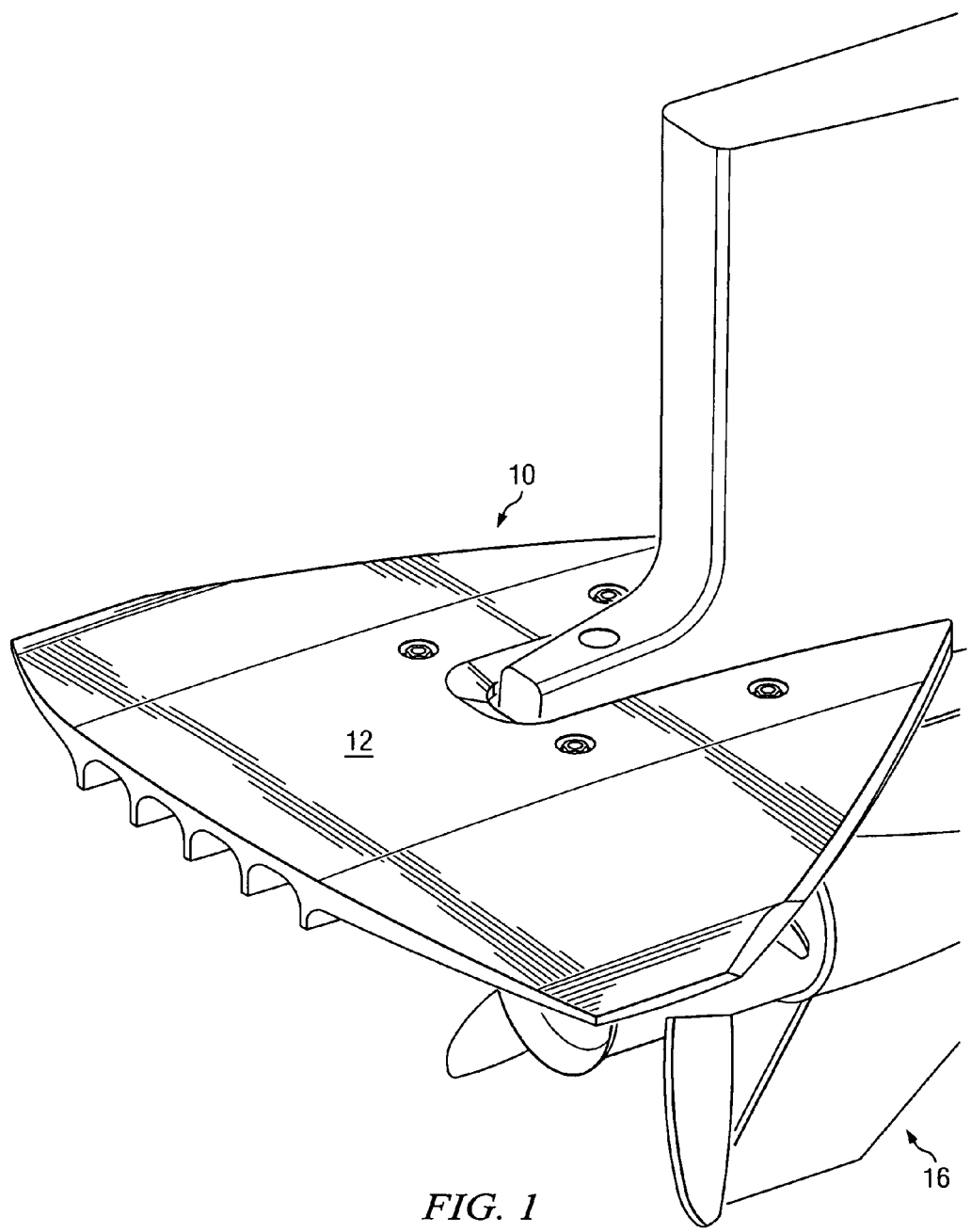
FIG. 1 is a perspective view of an assembly forming a first embodiment of the present invention mounting a hydrofoil on an outboard motor.
Figure 2:
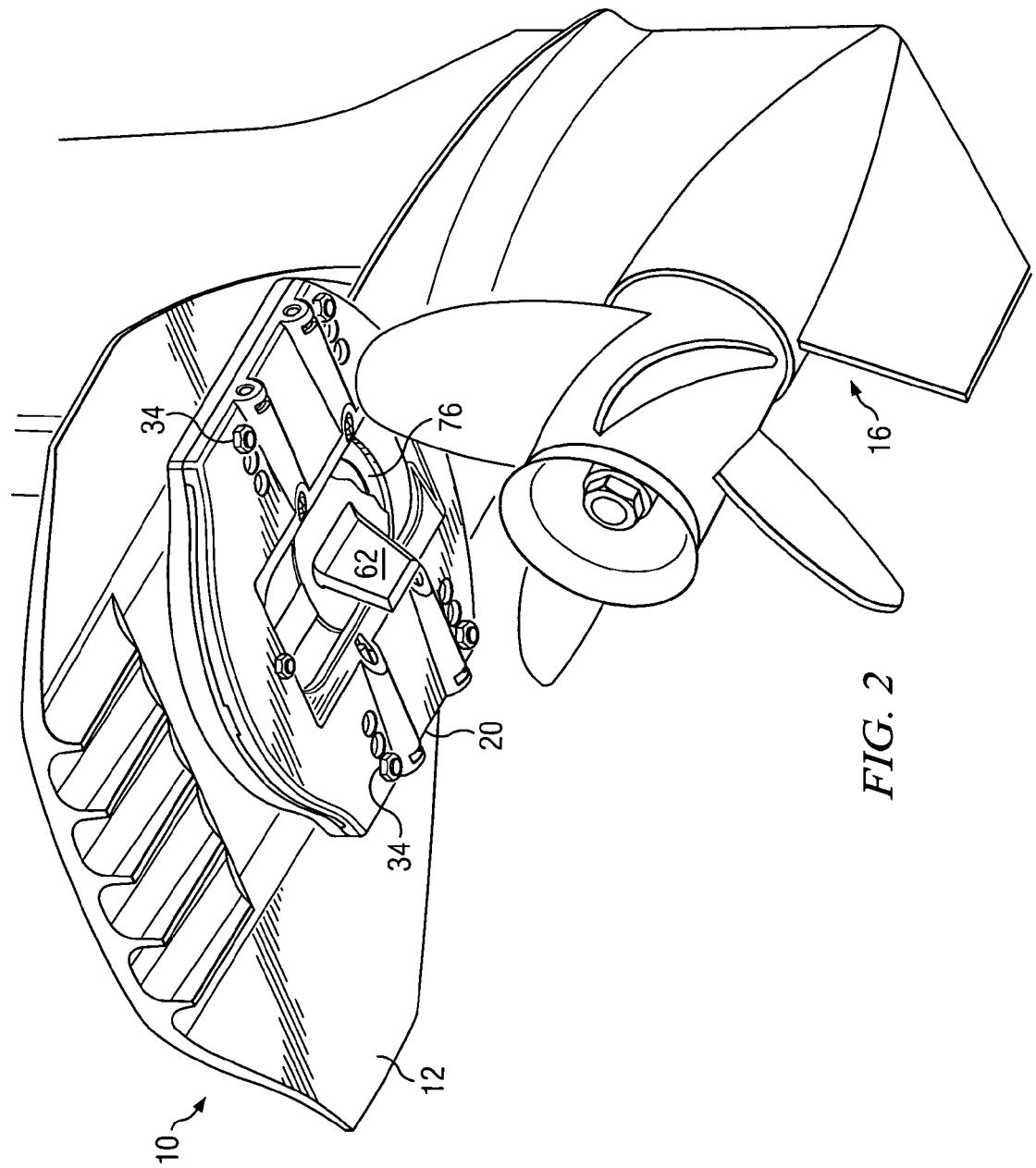
FIG. 2 is a perspective view from below of the assembly of FIG. 1.
Figure 3:
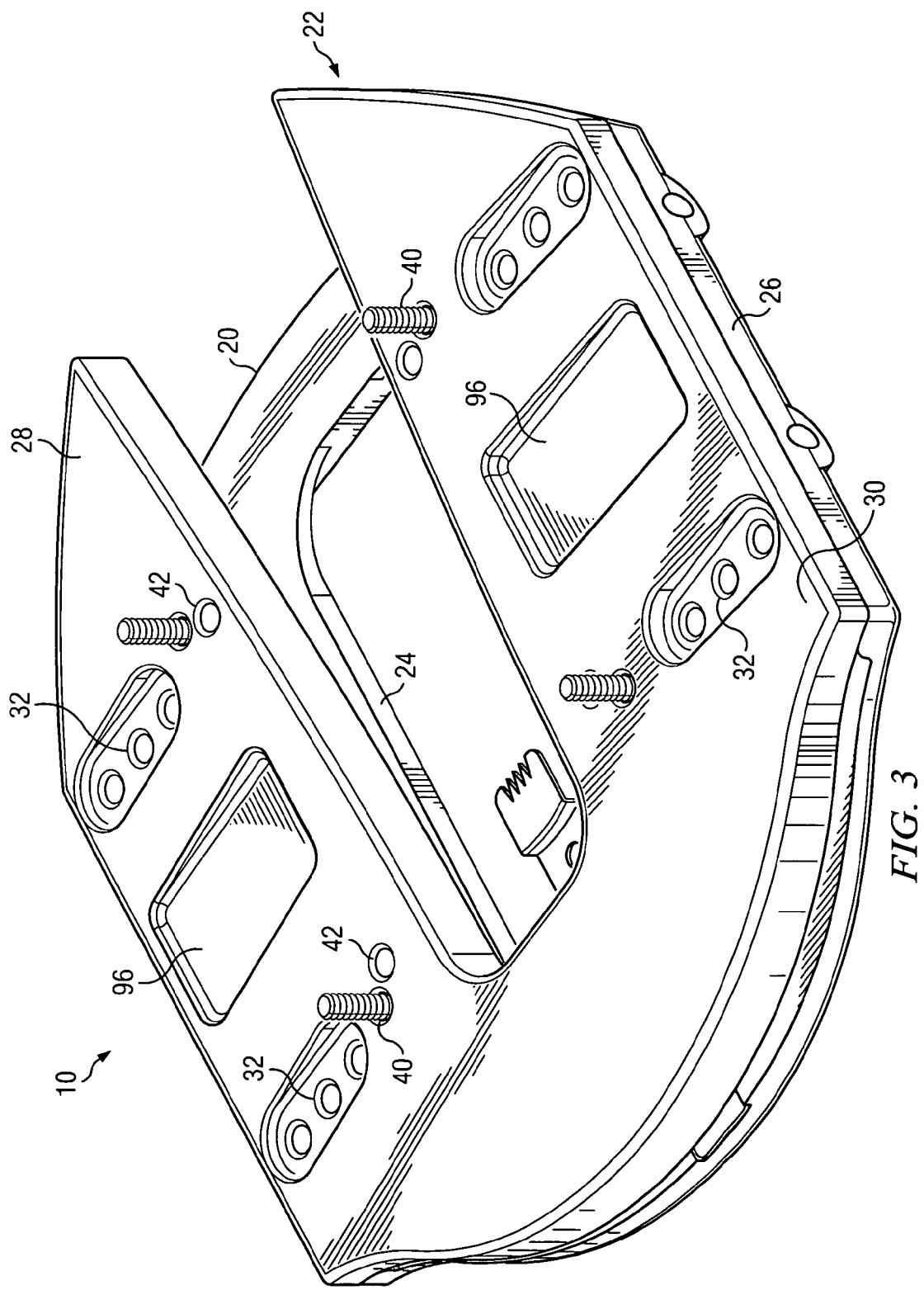
FIG. 3 is a perspective view of the assembly.
Figure 4:
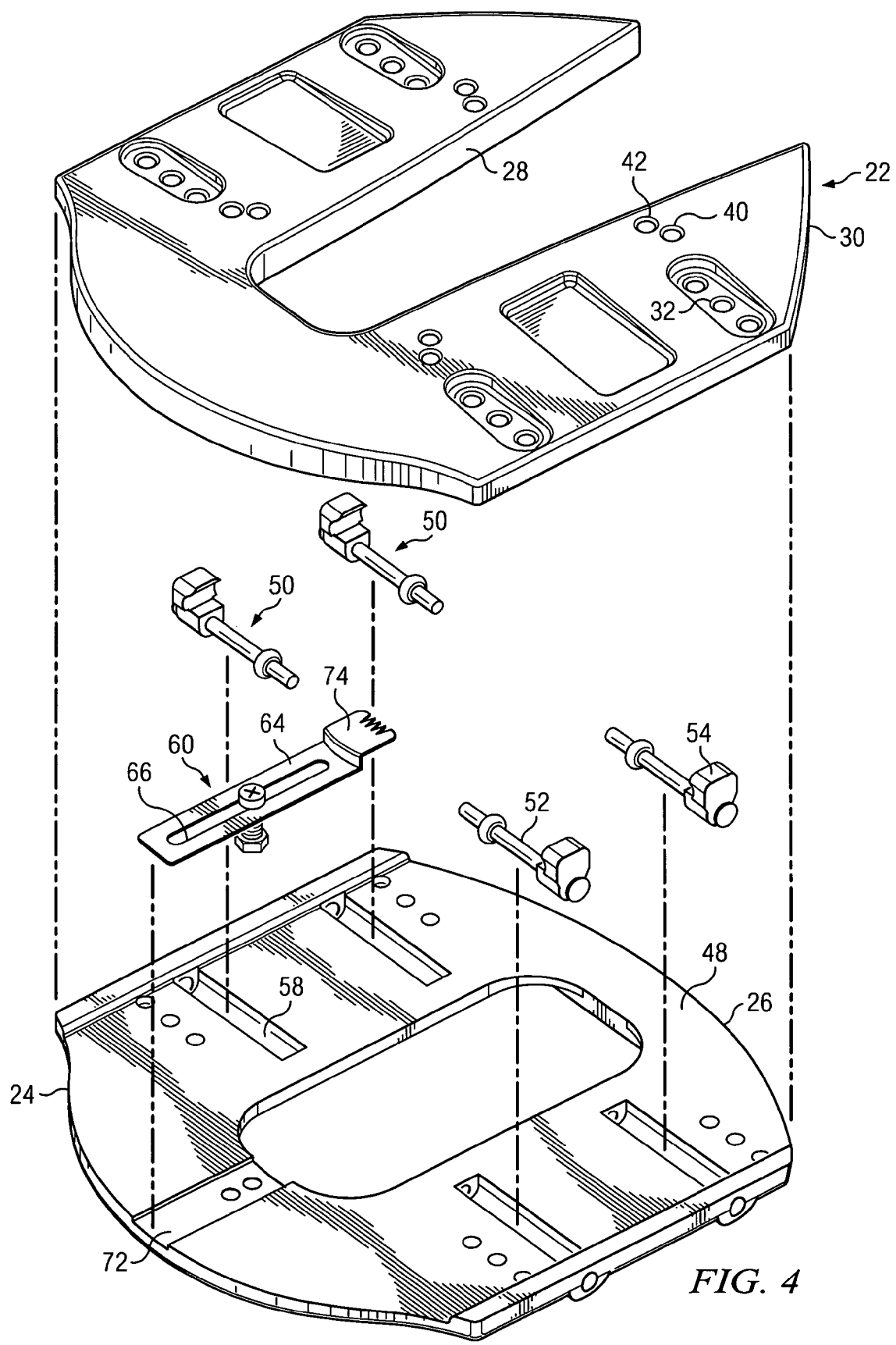
FIG. 4 is an exploded perspective view of the assembly.
Figure 5:
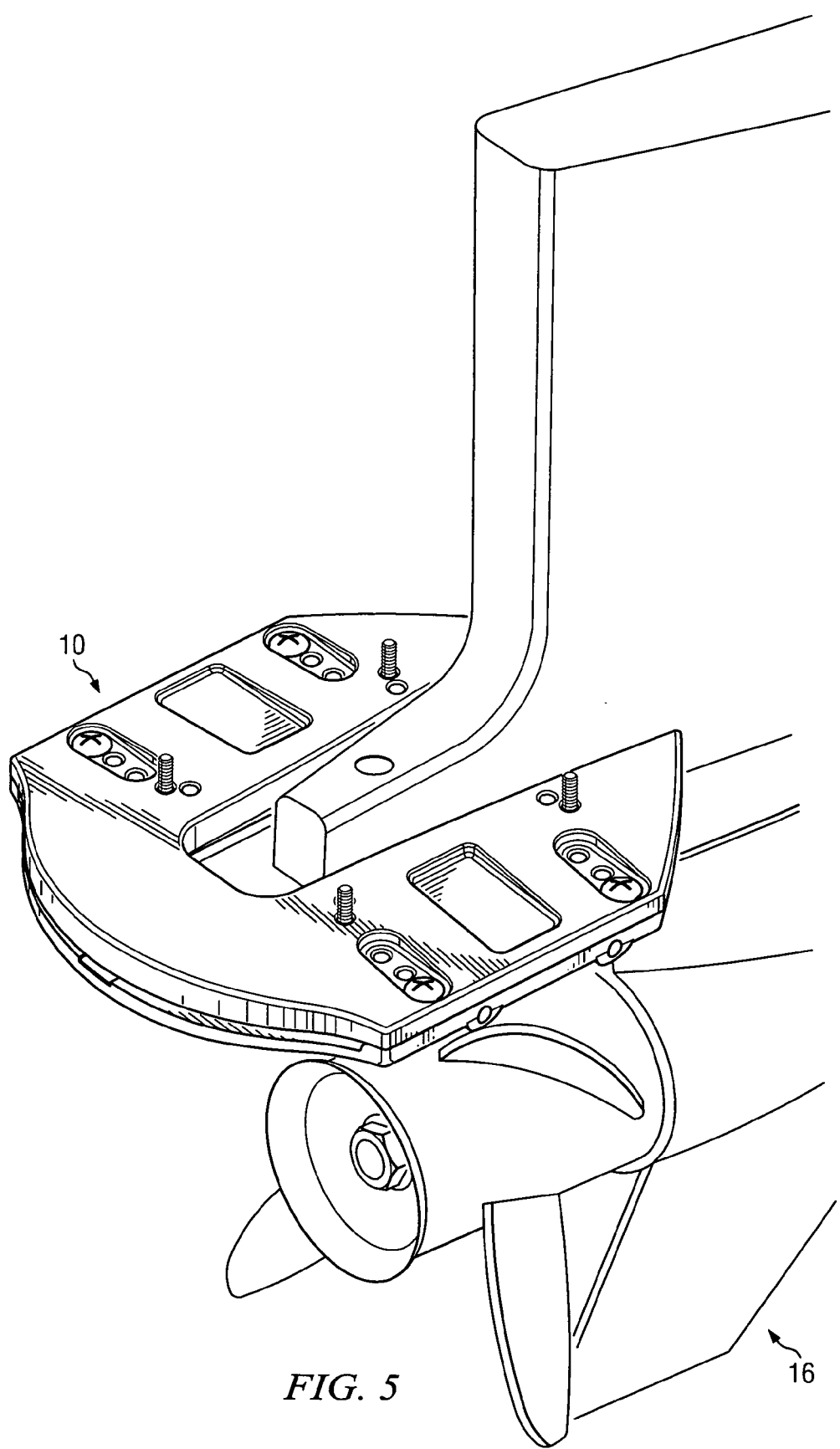
FIG. 5 is a perspective view of the assembly mounted on the outboard motor, prior to installing the hydrofoil.
Figure 7A:
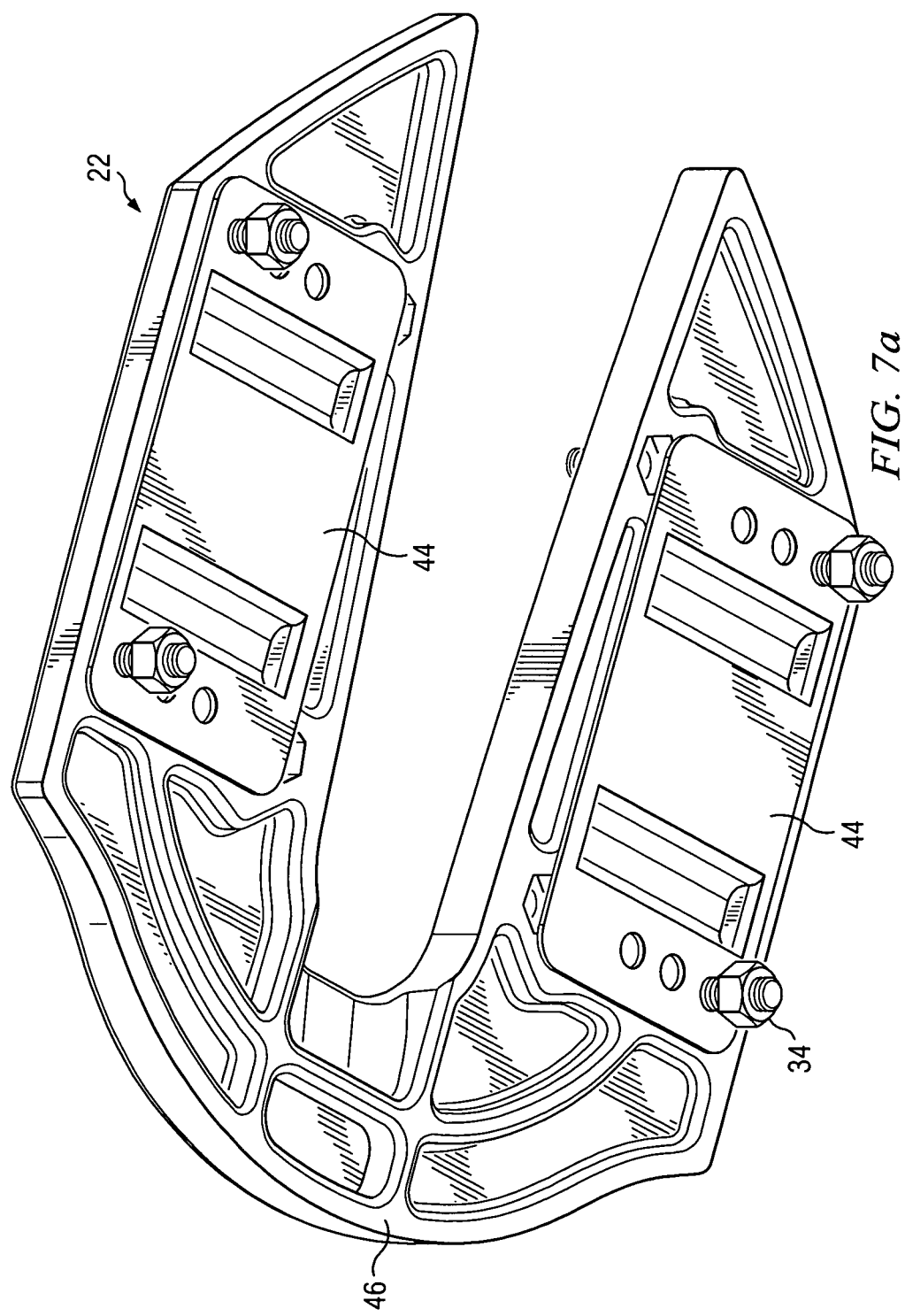
FIGS. 7a and 7b are lower and upper views respectively of the upper element of the assembly.
Figure 7B:
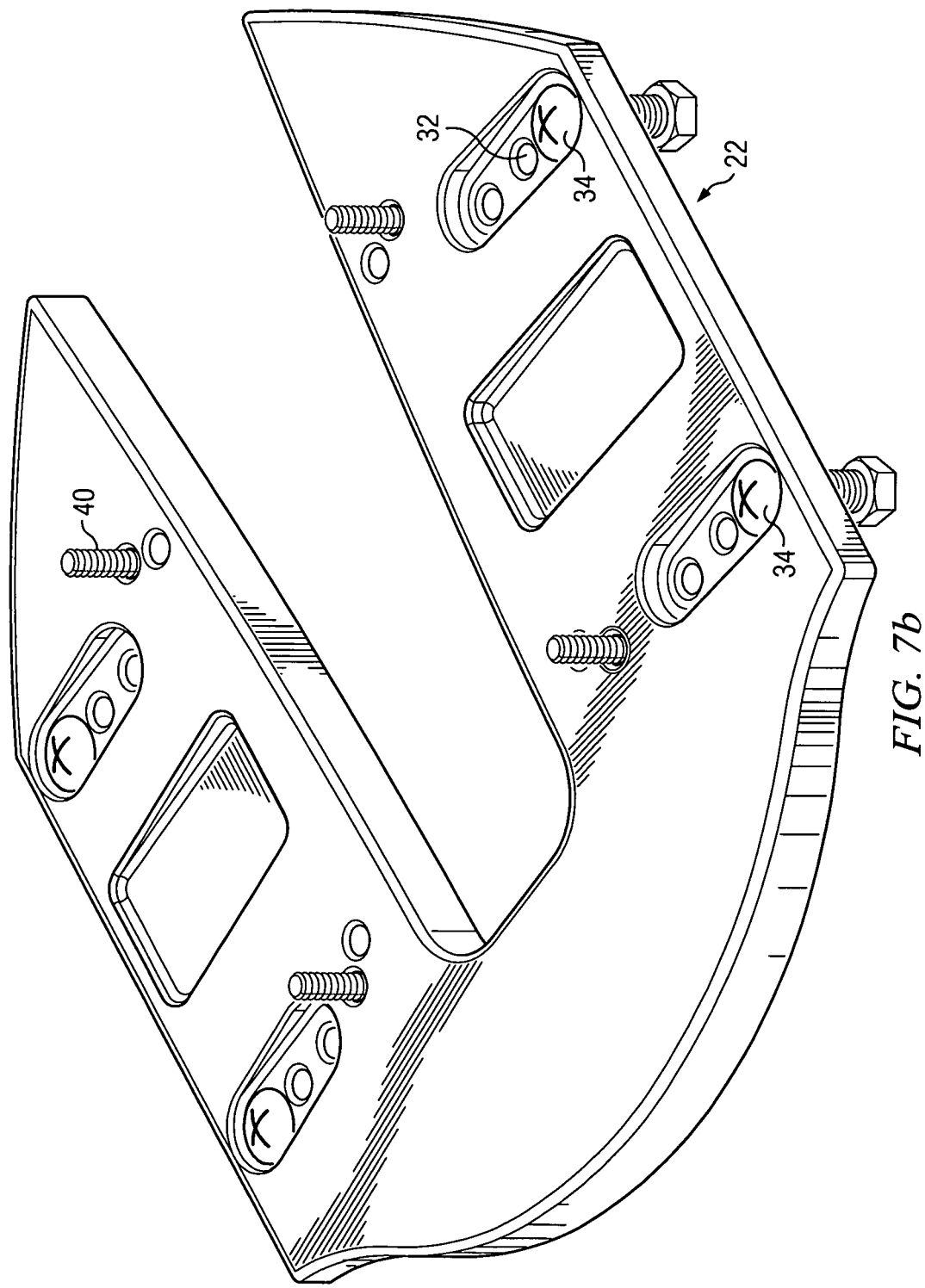
Figure 8:
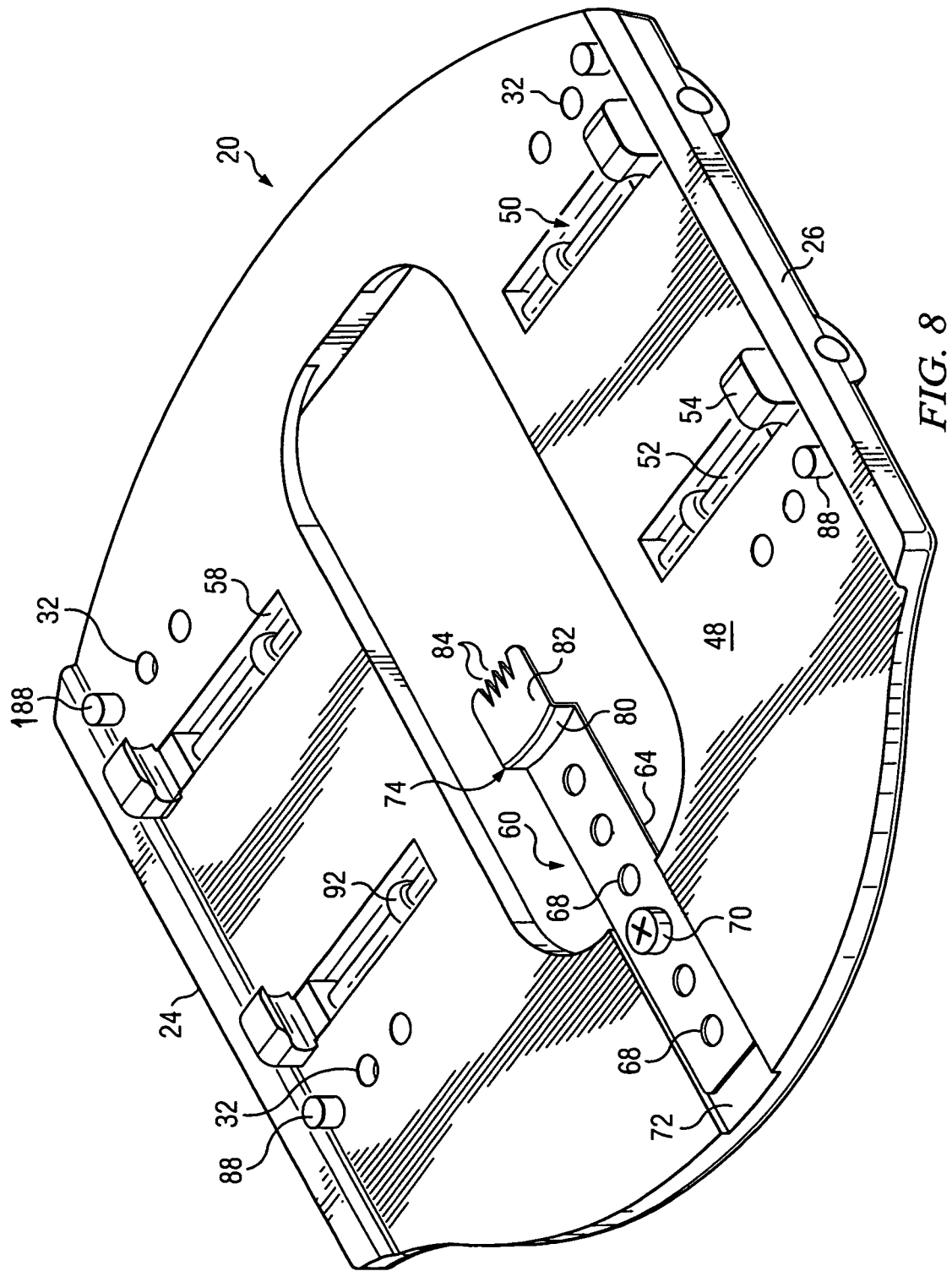
FIG. 8 is a perspective view of the lower element.
Figure 9:
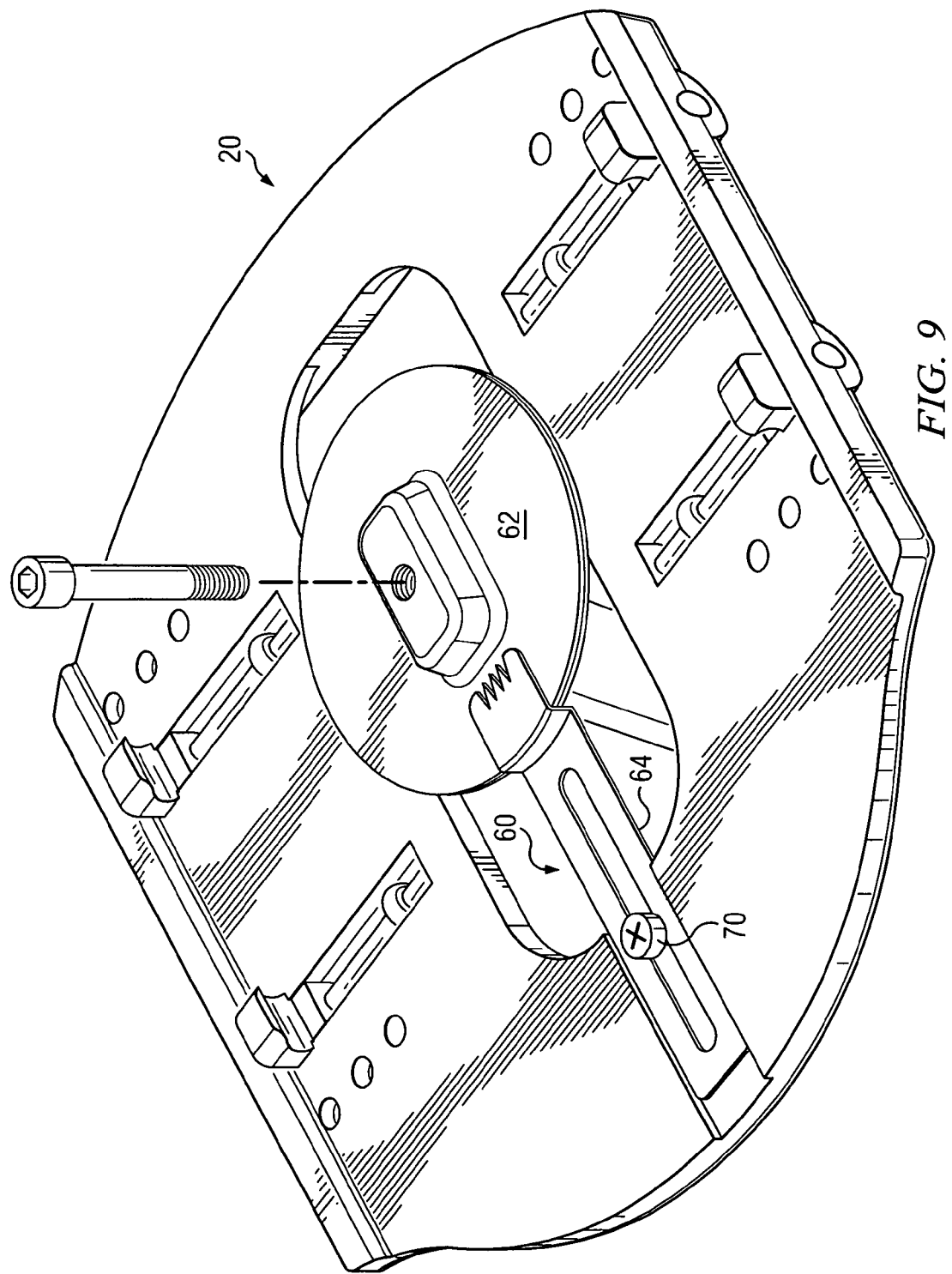
FIG. 9 is a perspective view of the lower element with a tab catch on a trim tab.
Figure 10:
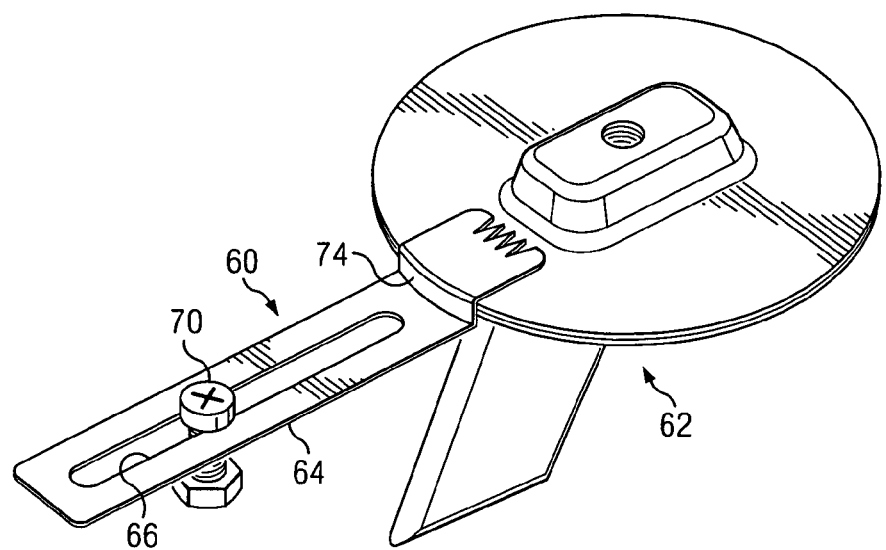
FIG. 10 is a detail perspective of the tab catch on the trim tab
Figure 11A:
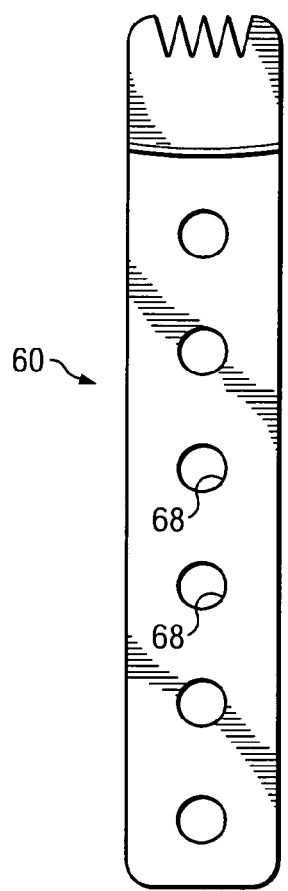
Figure 11B:
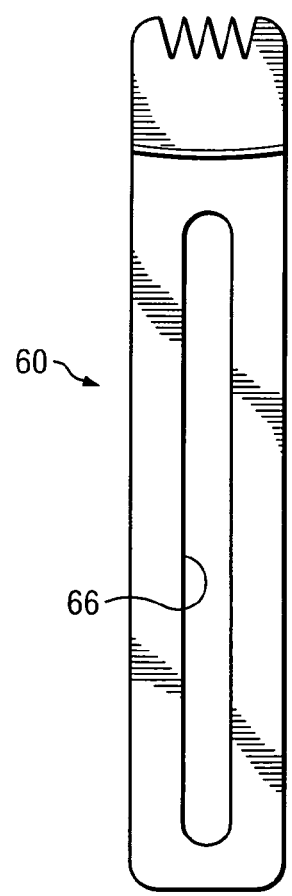
Figure 12:
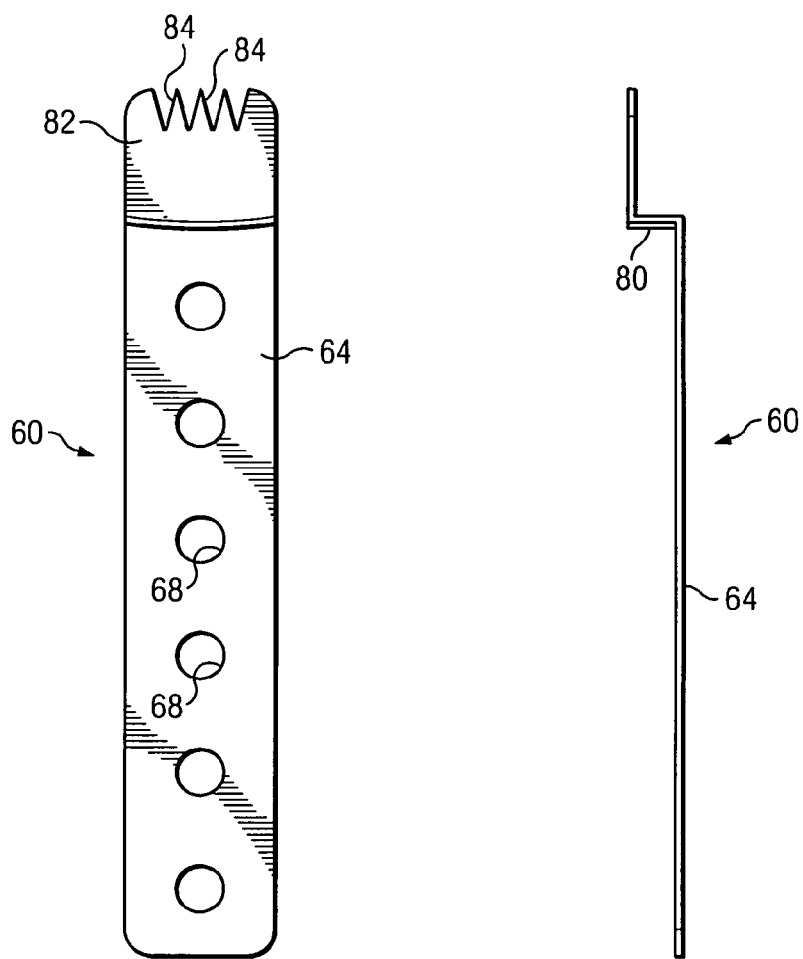
FIG. 12 is a detail perspective view of a modified tab catch having a curve.
Figure 12:
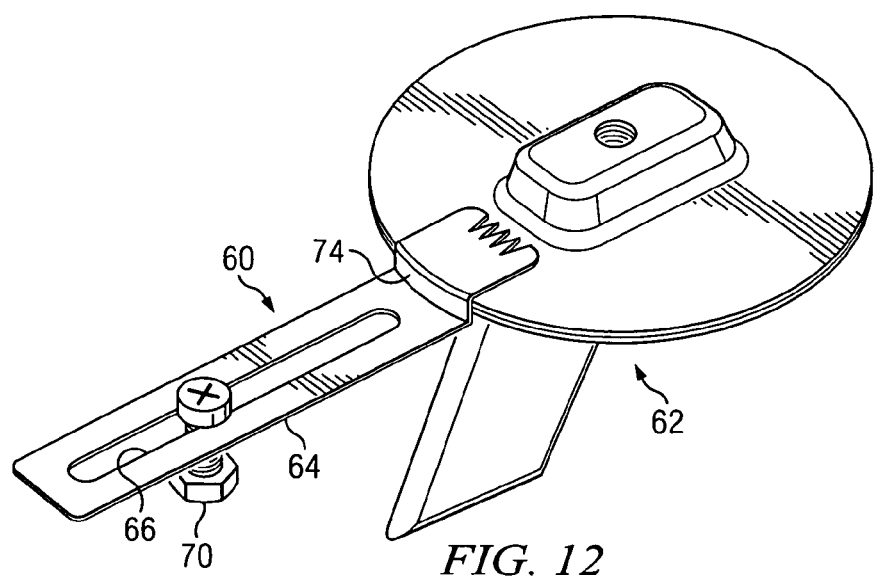
Figure 13:
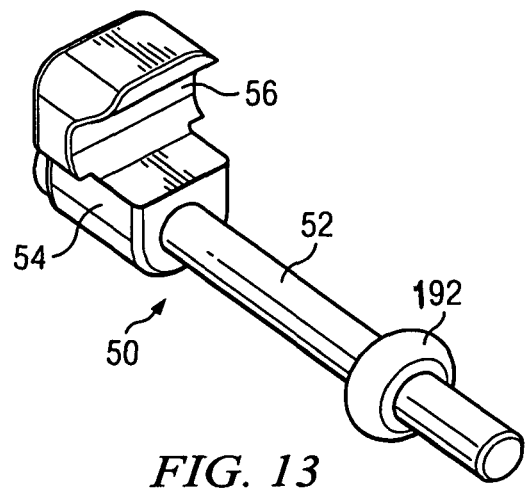
FIG. 13 is a side view of a grip used in the lower element.

With reference to FIGS. 3 and 4, the assembly 10 can be seen to include a lower element 20 and an upper element 22. The lower and upper elements 20 and 22 are preferably made of plastic, but could be made of metal, such as aluminum, or other suitable material. Each side 24 and 26 of element 20 and each side 28 and 30 of element 22 has a dual series of three inline holes 32 (four or more holes can be used, if desired) that can receive bolts 34 to secure the elements together and capture the plate 14 between the elements 20 and 22 to secure the assembly 10 to the plate 14. The holes 32 are spaced apart along the widths of the elements to match just beyond the edges 36 and 38 of various plate 14 widths. Plate 14 widths of 4, 5, 6 and 7 inches are common, for example. The bolts 34 are mounted in the holes closest to the edges 36 and 38 of the plate 14 to provide the most secure attachment. A bolt 34 is preferably mounted in each series of holes 32, for a total of four, one toward each corner of elements 20 and 22, as seen in FIG. 2. However, additional bolts 34 can be used if desired. Nylon bolt sleeves 188, as seen in FIG. 8, can be used about the portion of each bolt 34 between lower and upper elements 20 and 22 to reduce the likelihood of any damage occurring to the edges 36 and 38 of the plate 14. The upper element 22 is also provided with at least one bolt pattern 40, which matches the mounting hole pattern of many of the one piece hydrofoils on the market. A second bolt pattern 42 can also be provided for mounting a smaller foil. Additional bolt patterns can be used as necessary to adapt the assembly to the device to be attached. Preferably, the bolts used to attach the hydrofoil have flat sides, as seen in FIG. 7a, so that those bolts do not interfere with the attachment of the assembly 10 to the plate 14 and will not turn when the hydrofoil is installed.

Figure 18:
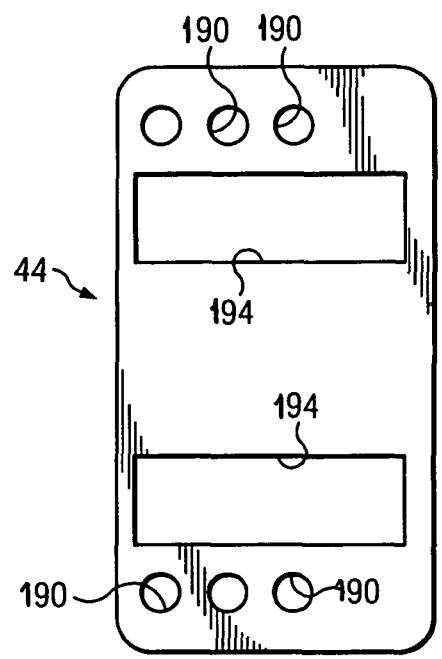
FIG. 18 is a plan view of the adhesive tape.

As the bolts 34 are tightened, the lower and upper elements 20 and 22 are compressed toward each other with the plate 14 sandwiched between, creating a sufficiently large frictional force to secure the assembly 10 on the plate 14. In most cases, the outer edges of the lower and upper elements 20 and 22 will contact each other as the bolts 34 are tightened. However, this frictional engagement can be supplemented by adhesive foam tape 44 mounted on the inside surface 46 of the upper element 22 as seen in FIGS. 7a and 18 which adheres to the inside surface 48 of the lower element 20 and/or to the plate 14 as the elements are compressed together. Tape 44 can be applied to the inner surface 48 of the lower element 20 also, if desired. The tape 44 has cutouts 190 aligned with the holes 32 as seen in FIG. 18. The tight compression provided by bolts 34 allows the use of both aggressive or removable adhesives.

An additional mechanism to secure assembly 10 to the plate 14 is provided by lateral grip devices 50 mounted in the lower element 20, as seen in FIGS. 4, 6, 8, 9, 13 and 17. The lower element 20 has a pair of channels 58 formed in the inside surface 48 on both sides 24 and 26. A grip device 50 is received in each channel 58 which includes a threaded rod 52 and a grip 54 threaded onto the rod 52. The rod 52 is confined in the channel 58 so that it can only be rotated about its elongate axis, but will not move along its length in the channel 58. A rubber grommet 192 can be put on the rod 52 to keep the rod 52 centered in the channel 58 and to prevent the rod from dropping out of the channel 58 when the customer starts to tighten the grip device. The grip 54 has sides that engage the walls of the channel such that as the rod 52 is turned, the grip 54 translates linearly along the channel 58. One end of each of the rods 52 is exposed at the edges of the lower element 20 and has a recess to receive a screw driver (Phillips or slot, for example) to facilitate rotation of the rods 52. Each grip 54 has a U-shaped notch 56 to engage the edge 36 or 38 of the plate 14.

Figure 6:
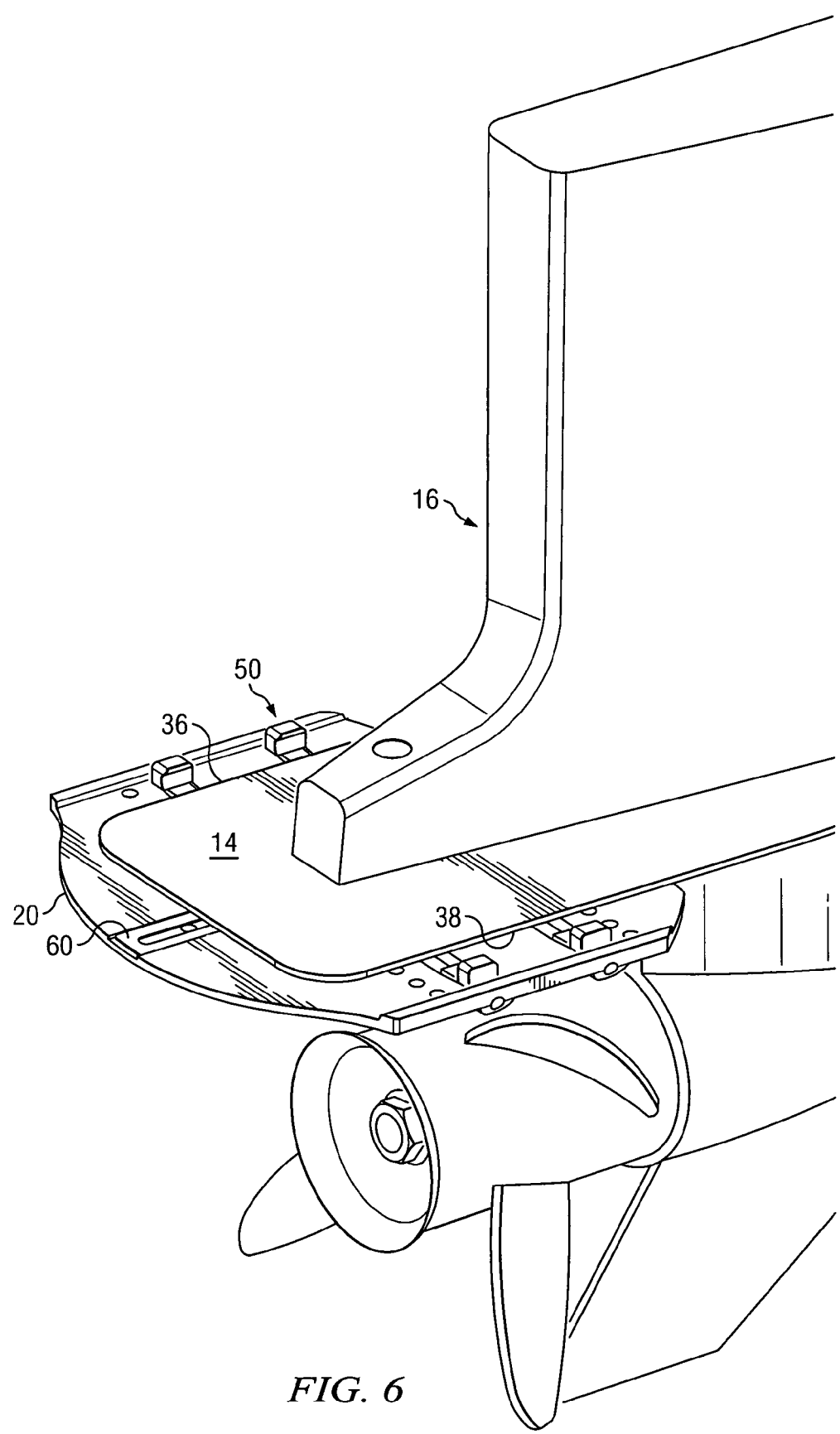
FIG. 6 is a perspective view of lower element of the assembly being mounted to the anti-ventilation plate of the outboard motor.
Figure 16:
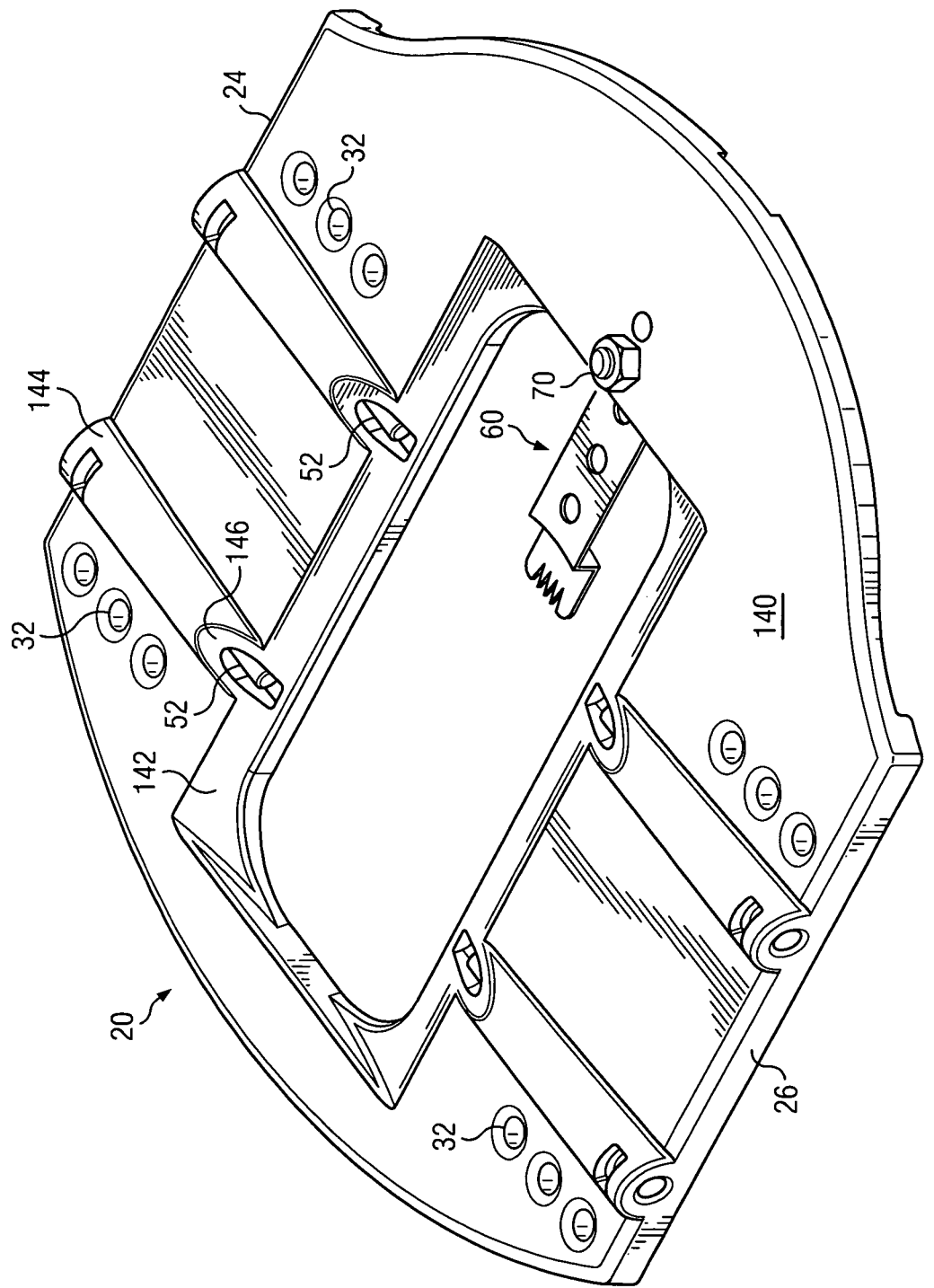
FIG. 16 is perspective view from below of the lower element.
Figure 17:
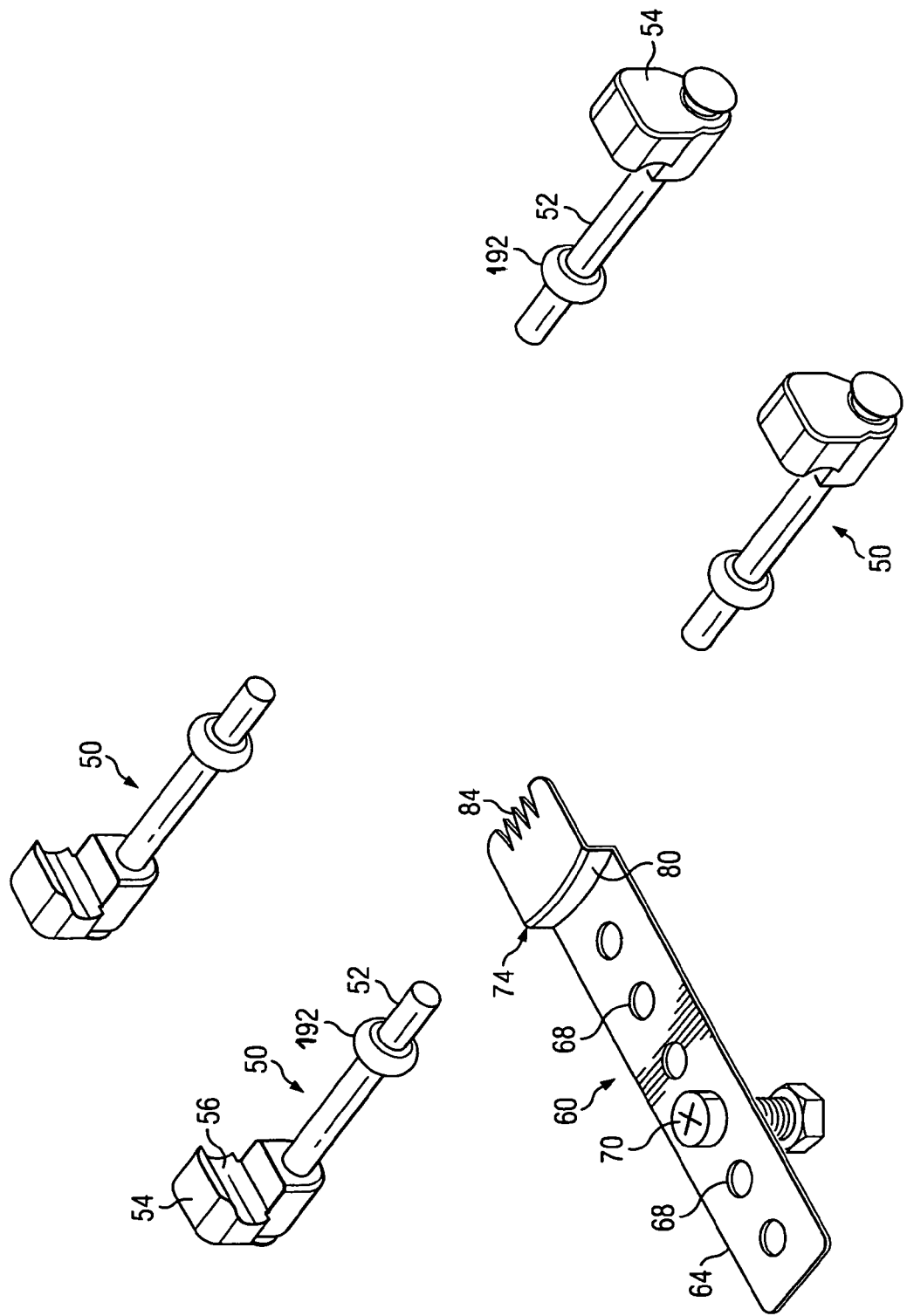
FIG. 17 is an exploded view of the grips and tab catch.

As can be seen in FIG. 6, the lower element 20 can be positioned below and in alignment with the plate 14 and the grips 54 can be tightened onto the edges 36 and 38 of the plate 14 by rotating the rods 52 from the edges of the lower element 20. As the grips are tightened onto the edges 36 and 38, the notches 56 engage the edges 36 and 38 to fasten the lower element 20 to the plate 14. A perfect fit may be accomplished by alternate adjustment for each side until the lower element 20 is centered. Preferably, the grips 54 are made of a material, such as plastic, that will not mar the plate 14 as they are tightened onto the plate 14. The tape 44 has cutouts 194 as seen in FIG. 18 and the inside surface 46 of the upper element 22 can have indentions to avoid interference with the grips 54. As seen in FIG. 16, the outside surface 140 of the lower element preferably has a beveled slope surface 142 and the humps 144 defining the channels 58 have bevels 146 to provide additional clearance between the assembly 10 and the propeller, particularly where the propeller has a close clearance to the bottom of the anti-ventilation plate.

Yet another mechanism to insure secure attachment of the assembly 10 to the plate 14 is catch 60, versions of which are seen in FIGS. 3, 4, 8, 9, 10, 11a-d, 12 and 16-17, that cooperates with the usual trim tab 62 on the outboard motor. The catch 60 has an elongate portion 64 which has either a slot 66 as shown in the version in FIG. 11b, or a series of holes 68 as shown in the version in FIGS. 8, 11a, 11c, and 11d to accept a bolt 70 to secure the catch 60 to the lower element 20. A slot 72 can also be formed into the inside surface 48 of the lower element 20 to keep the catch 60 in alignment. The catch 60 also has a bent portion 74 that fits into the trim tab recess 76 of motor 16, including a vertical surface 80 to engage the wall of the trim tab recess 76. The trim tab recess 76 is usually about ¼ inch deep and formed in the bottom of the anti-ventilation plate. The recess 76 is cylindrical and typically holds a trim tab or anode, depending on manufacturer or user preference. The recess 76 can receive, for example, a round flat sacrificial zinc anode with no steering fin. Alternatively, a trim tab, with fin, that is not made of zinc and therefore not a sacrificial anode, can be mounted in the trim tab recess. The trim tab can be made of zinc, combining the function of a trim tab and sacrificial anode. Typically, the trim tab or anode will be secured in the trim tab recess by a central bolt 86, which can be inserted from the top of the trim tab recess 76 or the bottom of the trim tab recess 76, depending on the design of the plate 14. In some designs, the trim tab recess 76 can have teeth which can mesh with teeth on the trim tab to prevent the fin from turning within the recess 76 and also to allow the fin to be set at an angle from the centerline of the boat. As seen in FIGS. 11a-d, 12 and 17, the portion 74 can be modified by being curved at the surface 80 to enhance the ability to drop the profile into a wide range of trim tab recess diameter sizes from 2 inches to over 3 inches with as little as 0.025 inch clearance, for a one size fits all attachment which does not interfere with the tab function and attachment. The surface 80 may have a radius of curvature of 1.525 inches, for example. The trim tab or anode can simply be removed from the recess, the portion 74 placed in the recess, and the trim tab or anode then reinserted in the recess and reattached with the same bolt. The catch 60 is designed to engage only the rear ¾ inch section of the tab recess and places little stress on the tab. The catch 60 can have a thickness of only 0.025 inches. Previous designs have excessively offset the entire tab to the point it becomes insecurely attached.

Preferably, the catch 60 is made of stainless steel, but could be made of another suitable material. The trim tab 62 is shown as being attached by a single bolt 86 from above in FIG. 9. However, as noted, trim tabs can also be mounted with a bolt from below. Also, some boats may have a sacrificial anode mounted in the recess instead of a trim tab. The catch 60 will work equally well with any method of mounting a trim tab or when a sacrificial anode is used. Prior designs have attempted to remove the trim tab, and then reattach the trim tab so that it is no longer received in the recess. This has typically required obtaining a special longer bolt than used to attach the trim tab alone, creating inconvenience for the boat owner. Also, the trim tab extends down further, creating a possibility of interference with the propeller. With the trim tab extending out of the recess, it is more common for the trim tab to become loose, and it is even possible to cause the trim tab to fall off the boat. As seen in FIGS. 3, 8, 11c, 11d, and 16-17, the end 82 of the catch 60 can also have teeth 84, which can engage the teeth on the trim tab recess 76 and/or trim tab or anode, to enhance mounting.

Figure 19:
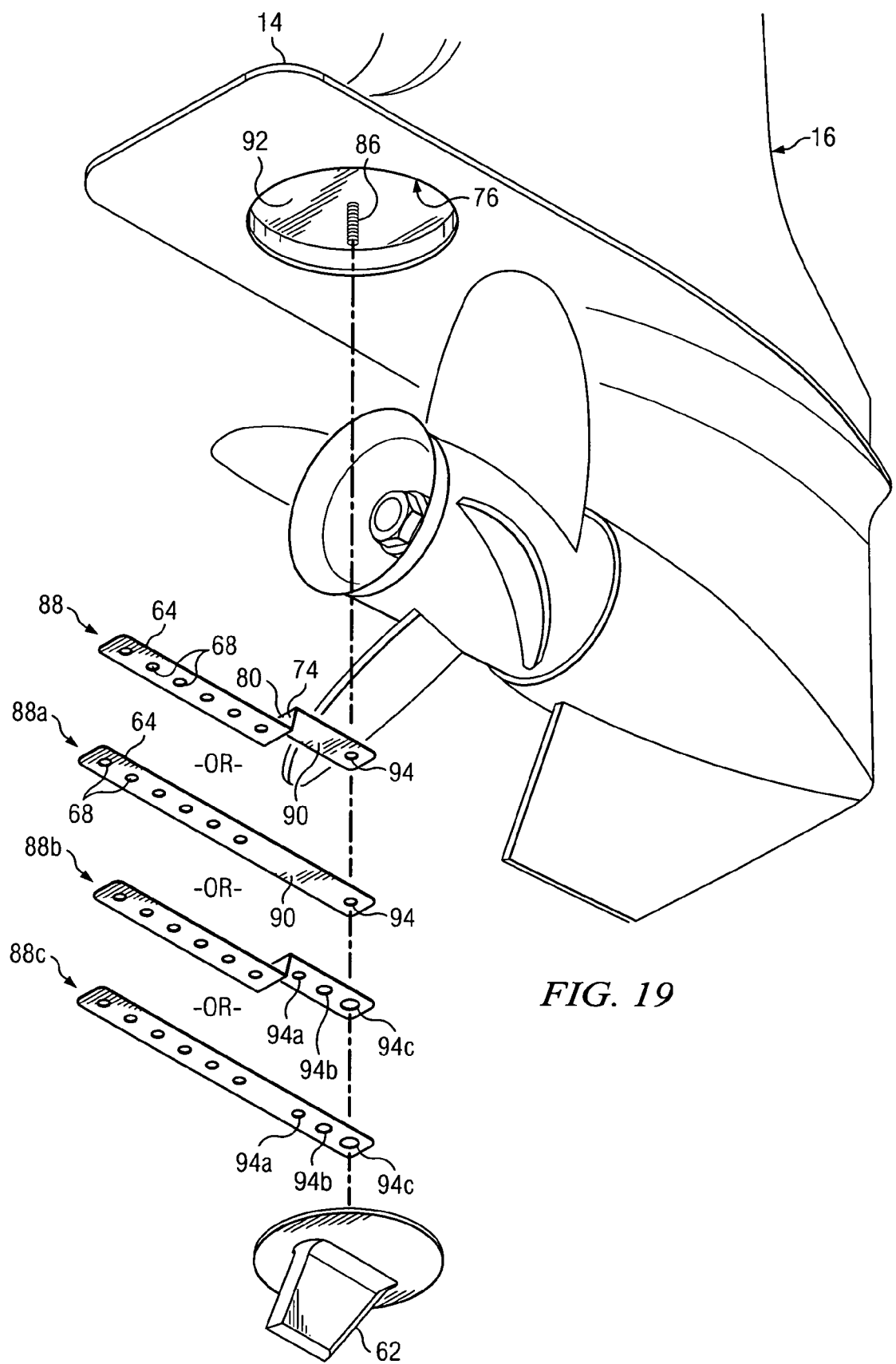
FIG. 19 is an exploded perspective view of a modified tab catch for use with an outboard motor.
Figure 20:
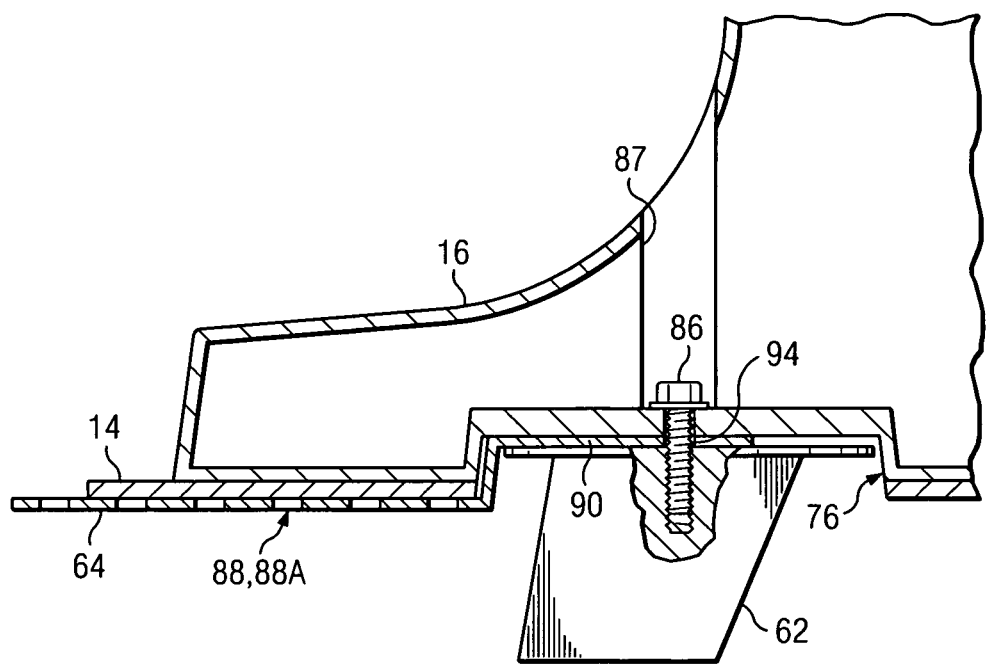
FIG. 20 is a cross-sectional view of the modified tab catch in the tab recess.
Figure 21:
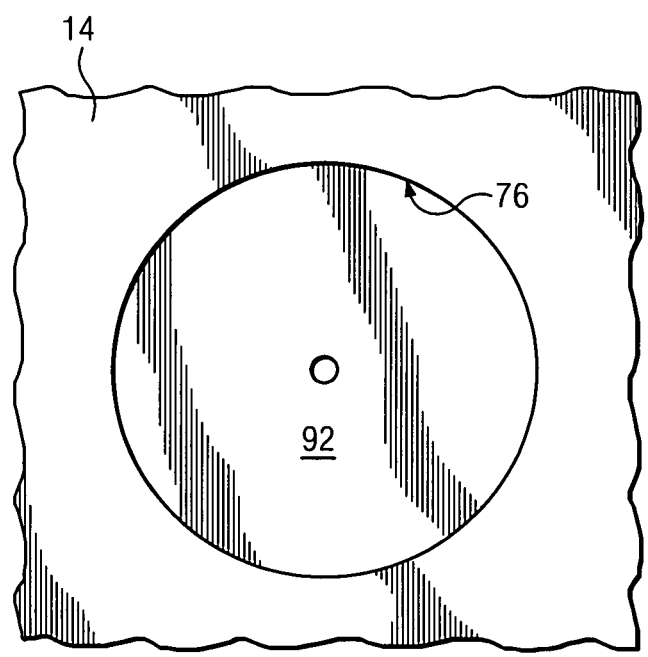
FIG. 21 is a bottom view of an outboard motor showing the tab recess.

With reference to FIGS. 19 and 20, a modified catch 88 will be described. Catch 88 is identical to catch 60 in having bent portion 74 with vertical surface 80 and elongate portion 64 with either slot 66 or holes 68 (only holes 68 are illustrated in the figures) for attachment to the lower element 20 by bolt 70. However, catch 88 has a portion 90 that extends from bent portion 74 along the bottom 92 of the trim tab recess 76 at least as far as the bolt 86. Portion 90 has a hole 94 through which the bolt 86 extends to secure the trim tab 62 in the trim tab recess 76 as seen in FIG. 20. Thus, the catch 88 is securely fastened in the trim tab recess 76 not only by the clamping action of trim tab 62 being secured within the trim tab recess 76 by tightening bolt 86, just as catch 60, but also by the bolt 86 passing through the hole 94 in the catch 88. If, for example, the bolt 86 should loosen in service, reducing the clamping action on the catch 88, the catch 88 will be prevented from slipping out of the trim tab recess 76 by the bolt 86 passing through the hole 94 in the catch 88. Further, while bolt 86 is illustrated as passing down through the motor 16 and plate 14 for threading into the trim tab 62, the catch 88 would work equally well if the design of the outboard motor 16 is such as to have the bolt 86 inserted from below into the trim tab for threading into the motor 16, as is done by certain manufacturers.

The catch 88 is shown having an initial bent portion 74. Alternatively, a catch 88a, as seen in FIGS. 19 and 20, can be provided to the boat owner without a bent portion 74 so that the boat owner can bend the catch 88a to fit the particular installation. For example, some trim tabs can have an extension which fits into a slot extending further into the motor 16 than the recess 76 and the catch 88a would have to be bent to fit around that extension for the bolt 86 to pass through hole 94.

To provide more flexibility, catches 88 and 88a can be modified as catches 88b and 88c, respectively, to have multiple holes 94a, 94b and 94c of different diameters to receive various sizes of bolts 86. For example, Mercury outboards may use a bolt 86 of diameter 7/16 inch, Honda outboards may use a bolt 86 of 10 mm diameter, and Yamaha outboards may use a bolt 86 of 8 mm diameter. Preferably, the smallest diameter hole 94a is closest to the elongate portion 64 while the largest diameter hole 94c is farthest from the elongate portion 64.

The catches 88 and 88a-88c can be made of any suitable material, for example of metal or plastic, such as stainless steel, para-aramid synthetic fiber such as sold by Dupont Co. of Wilmington, Del. under the trademark Kevlar, a polyamide such as Nylon or a blend of polyphenylene oxide and polystyrene such as sold by SABIC (Saudi Arabian Basic Industries Corporation) of Saudi Arabia under the trademark Noryl. Further, the catches can be of multiple components bonded or otherwise secured together, such as portion 64 and portion 90 made of a rigid material such as stainless steel connected by a flexible material to form the portion bending over the trim tab. By making the catches 88a and 88c of suitable flexible and deformable material, such as annealed stainless steel, the tightening of bolt 86 drawing trim tab 62 into the trim tab recess 76 with the catch 88a or 88c in place can deform the catch 88a or 88c as needed to conform with the shape of the recess 76 and trim tab 62 to avoid the need to pre-bend the catch before installation.

Figure 22:
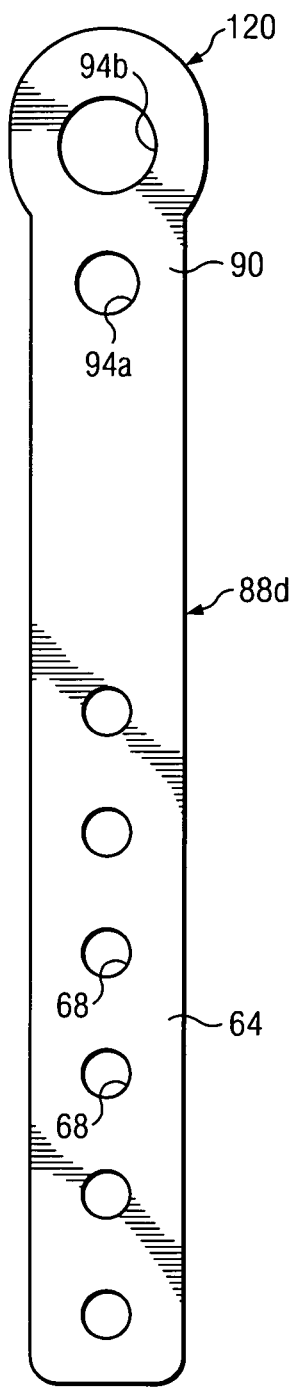
FIG. 22 is a plan view of a modified tab catch.

FIG. 22 illustrates a catch 88d which is identical to catches 88a and 88c in not having an initial bent portion 74 and which is other wise used in the identical manner to catches 88, 88a, 88b and 88c. Catch 88d is formed of SS-316 annealed stainless steel. This makes catch 88d very flexible and provides great elongation strength. Catch 88d should conform to any trim tab/anode cavity. In one catch 88d constructed in accordance with the teachings of the present invention, the holes 68 are 0.19 inches in diameter and spaced 0.50 inch center to center along elongate portion 64. The smaller hole 94a has a diameter of 0.30 inch while the larger hole 94b has a diameter of 0.452 inches. The overall length of the catch 88d is about 6 inches, the thickness 0.025 inches and the width about 3/4 inches except where the catch 88d expands out to form an outer circumferential end 120 centered on hole 94b. The outer circumferential end 120 provides a substantially constant width of material in catch 88d surrounding the hole 94b for strength. The smaller hole 94a will be used for smaller motors with smaller bolts. To install catch 88d on certain Volvo sterndrives, it is recommended to install a 0.25 inch diameter bolt, nut and washers in the factory produced cavitation plate hole (which seldom has a trim tab/anode installed) to facilitate the use of the catch 88d.

Thus, four techniques have been disclosed to ensure a secure mounting of the assembly 10 for use on boats, including high speed boats. Any one of these techniques would secure the assembly 10 on the plate 14 alone, but in combination, assure a secure attachment. The four techniques are, as discussed above, (1) Compression of the upper and lower elements, (2) Adhesive foam tape mounted on at least one of the upper and lower elements, (3) Lateral grips (four preferred) with a U-shaped interface mounted on screws to tighten and hold the plate 14 and prevent both horizontal and vertical movement, and (4) the catch that interfaces in the recess of the trim tab/sacrificial anode depression and prevents rearward movement of the assembly 10 at high speeds.

Figure 14:
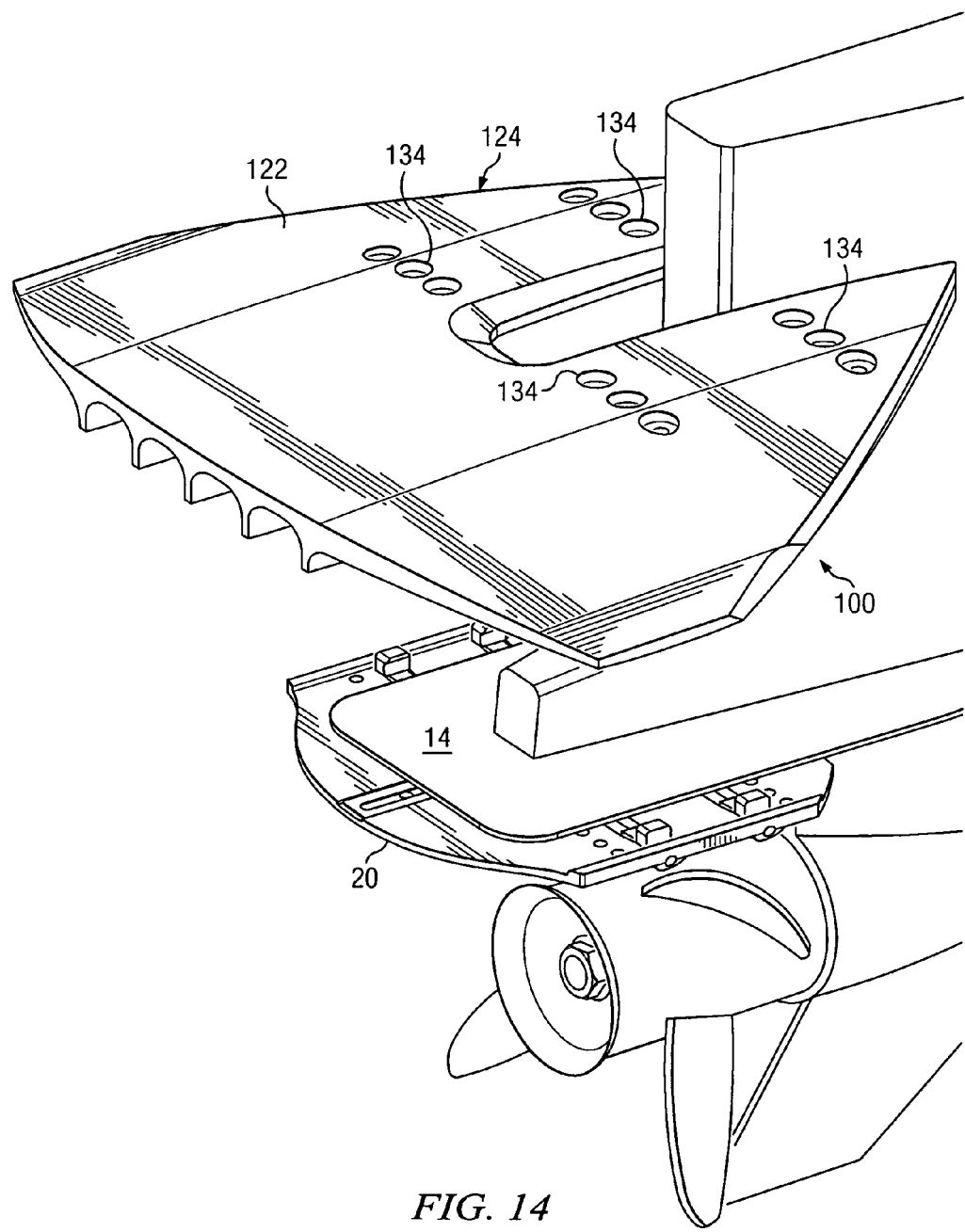
FIG. 14 is an exploded perspective view of a second embodiment of the present invention with the upper element forming a hydrofoil.
Figure 15:
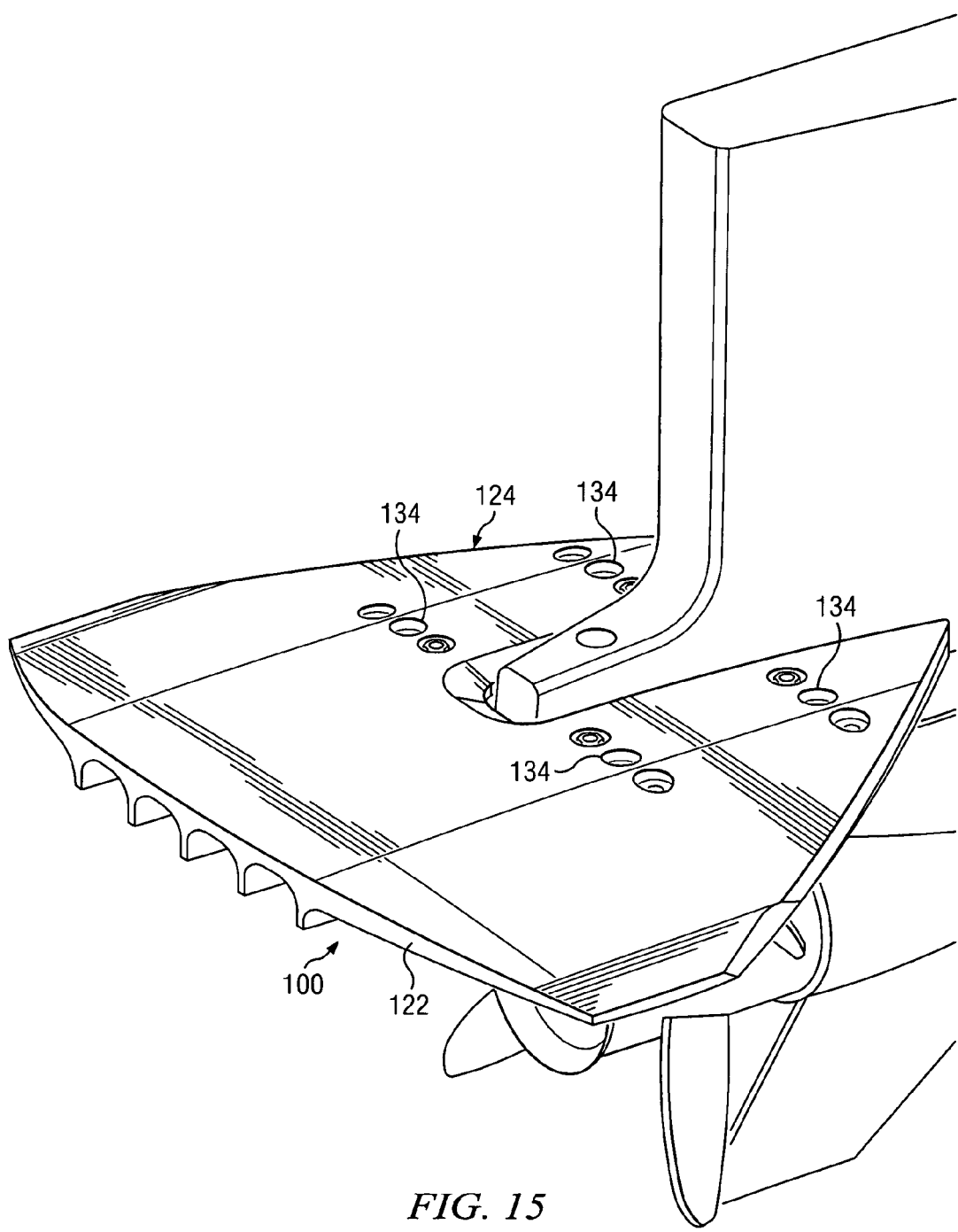
FIG. 15 is a perspective view of the second embodiment of FIG. 14.

With reference now to FIGS. 14 and 15, a second embodiment of the present invention is illustrated forming assembly 100. Assembly 100 uses the identical lower element 20, but has an upper element 122 which actually is formed as a hydrofoil 124. Preferably, the upper element 122 also has a series of inline holes 134 to allow the assembly to be secured to different width plates 14. In all aspects of attachment, the upper and lower elements 122 and 20 of assembly 100 operate the same as upper and lower elements 22 and 20 of assembly 10.

As can be understood, the assemblies 10 and 100 provide a method for attaching a one piece hydrofoil to the anti-ventilation plate 14 of a boat without the need to drill attachment holes in the boat engine. The assemblies will function with a range of plate widths and fit tightly on the plate. Only simple tools are needed to install the assemblies and hydrofoil and the operation is sufficiently straightforward for the typical boat owner to undertake the installation.

While several embodiments of the present invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

The invention claimed is:

1. An assembly for mounting to a plate on an outboard motor or sterndrive, the outboard motor or sterndrive having a trim tab recess, and a trim tab or anode removably mounted in the trim tab recess, comprising:
   a first element, the first element having a catch, the assembly being secured to the plate by the catch secured in the trim tab recess by the trim tab or anode; and
   wherein the first element is a lower element having an outer side and an inner side, the assembly further having an upper element having an outer side and an inner side, and at least one fastener to fasten the upper and lower elements together with the plate between the upper and lower elements to form the assembly and to assist in securing the assembly to the plate.

2. The assembly of claim 1 wherein the catch has a bent portion to engage the trim tab recess, the catch being adjustably mounted on the first element for movement toward and away from the trim tab recess.

3. The assembly of claim 1 wherein the outboard motor or sterndrive has a bolt to secure the trim tab or anode in the trim tab recess, the catch having a hole to receive the bolt.

4. The assembly of claim 3 wherein the catch has a plurality of holes to permit the catch to be used with outboard motors or sterndrives of different configurations.

5. The assembly of claim 4 wherein the plurality of holes each have a different diameter.

6. The assembly of claim 1 wherein the first element has a notch receiving a portion of the catch.

7. The assembly of claim 1 wherein the plate is an anti-ventilation plate on an outboard motor or sterndrive.

8. The assembly of claim 1 wherein the assembly has at least one pattern of holes to which can be mounted a hydrofoil, trolling plate or trolling motor.

9. The assembly of claim 1 wherein the catch is made of stainless steel.

10. The assembly of claim 1 wherein the plate has edges and wherein the first element has at least one grip device mounted on a first side thereof and at least one grip device mounted on a second side thereof, the assembly also being secured to the plate by said grip devices tightened against the edges of the plate.

11. An assembly for mounting to a plate on an outboard motor or sterndrive, comprising:
   a first element; and
   wherein the plate has a trim tab recess, the first element having a catch, the assembly being secured to the plate by the catch engaging the trim tab recess wherein the plate has edges and wherein the first element has at least one grip device mounted on a first side thereof and at least one grip device mounted on a second side thereof, the assembly also being secured to the plate by said grip devices tightened against the edges of the plate, wherein the first element has a notch in the inside surface thereof associated with each grip device, the grip device including a grip and a threaded rod having an elongate axis received in said notch, the threaded rod being rotatable about its elongate axis in said notch but restrained from motion along its elongate axis by the notch, the grip threaded on the threaded rod so that rotation of the threaded rod translates the grip along the notch.

12. The assembly of claim 10 wherein the assembly includes four grip devices.

13. The assembly of claim 1 wherein the upper and lower elements each have a first and second side, the first and second sides on opposite sides of the plate, at least one first fastener to fasten together the first sides of the upper and lower elements and at least one second fastener to fasten together the second sides of the upper and lower elements with the plate secured between the upper and lower members.

14. The assembly of claim 1 further having an adhesive mounted on at least one of the inner sides of the elements, the assembly being secured to the plate by the adhesive.

15. The assembly of claim 1 wherein the upper and lower elements are made of plastic or metal.

16. The assembly of claim 1 wherein the assembly includes four fasteners.

17. The assembly of claim 1 wherein the upper and lower elements have multiple apertures for receiving a fastener to adapt the assembly to plates of different widths.

18. The assembly of claim 17 wherein the apertures lie just beyond the edges of the plate.

* * * * *